United States Patent
Cooke et al.

(10) Patent No.: US 10,524,182 B2
(45) Date of Patent: Dec. 31, 2019

(54) SMALL CELL BACKHAUL

(71) Applicant: GENESIS TECHNICAL SYSTEMS CORP., Calgary (CA)

(72) Inventors: Stephen Cooke, Landgon (CA); Keith Brown, Bozeat (GB)

(73) Assignee: GENESIS TECHNICAL SYSTEMS CORP., Calgary (CA)

( * ) Notice: Subject to any disclaimer, the term of this patent is extended or adjusted under 35 U.S.C. 154(b) by 105 days.

(21) Appl. No.: 15/609,986

(22) Filed: May 31, 2017

(65) Prior Publication Data

US 2017/0265120 A1 Sep. 14, 2017

Related U.S. Application Data

(63) Continuation of application No. PCT/CA2015/050517, filed on Jun. 4, 2015.

(Continued)

(51) Int. Cl.
*H04W 4/00* (2018.01)
*H04W 40/02* (2009.01)
(Continued)

(52) U.S. Cl.
CPC ............ *H04W 40/02* (2013.01); *H04L 12/42* (2013.01); *H04L 45/74* (2013.01);
(Continued)

(58) Field of Classification Search
None
See application file for complete search history.

(56) References Cited

U.S. PATENT DOCUMENTS 6,665,733 B1 * 12/2003 Witkowski ............ H04L 12/467
370/235
6,934,760 B1 8/2005 Westbrook et al.
(Continued)

FOREIGN PATENT DOCUMENTS

WO WO-03/092230 A1 11/2003
WO WO-2007/116411 A1 10/2007
(Continued)

OTHER PUBLICATIONS

International Preliminary Report on Patentability for International Patent Application No. PCT/CA2015/050517, dated Jun. 6, 2017 (8 pages).

(Continued)

*Primary Examiner* — Bob A Phunkulh
(74) *Attorney, Agent, or Firm* — Clark & Elbing LLP

(57) ABSTRACT

Apparatus and methods for providing small cell backhaul are disclosed. A network node that acts as a gateway for a local communication network to a main communication network through a bonded link with the main communication network also provides a wireless communication module with a backhaul communication link to the main communication network through its bonded link. A switch module in the network node switches communication traffic between the local communication network, the wireless communication module and the bonded link to the main communication network. The network node may power the wireless communication module utilizing remote power provided by the main communication network, the local communication network, and/or a local source of power. Apparatus and methods for providing a transparent bonded link through a network access multiplexer are also disclosed, including management of the bonded link and of nodes subtending from the bonded link.

14 Claims, 8 Drawing Sheets

Related U.S. Application Data

(60) Provisional application No. 62/085,765, filed on Dec. 1, 2014.

(51) Int. Cl.
*H04L 12/42* (2006.01)
*H04M 11/06* (2006.01)
*H04W 40/24* (2009.01)
*H04L 12/741* (2013.01)
*H04L 12/64* (2006.01)
*H04W 88/16* (2009.01)

(52) U.S. Cl.
CPC ......... *H04M 11/062* (2013.01); *H04W 40/24* (2013.01); *H04L 2012/6478* (2013.01); *H04W 88/16* (2013.01); *Y02D 70/00* (2018.01)

(56) References Cited

U.S. PATENT DOCUMENTS

| | | | |
|---|---|---|---|
| 8,701,152 | B2 | 4/2014 | Chen et al. |
| 8,711,836 | B2 | 4/2014 | Cooke et al. |
| 2004/0062198 | A1* | 4/2004 | Pedersen ................. H04L 45/00 370/229 |
| 2006/0176900 | A1 | 8/2006 | Liu et al. |
| 2006/0215689 | A1 | 9/2006 | Liu et al. |
| 2007/0030856 | A1* | 2/2007 | Cooke .................. H04M 11/062 370/401 |
| 2008/0117863 | A1 | 5/2008 | Cotton et al. |
| 2009/0092242 | A1* | 4/2009 | Cooke .................. H04M 19/08 379/324 |
| 2010/0214911 | A1* | 8/2010 | Cooke .................... H04L 12/66 370/229 |
| 2011/0090892 | A1 | 4/2011 | Cooke |
| 2011/0110359 | A1* | 5/2011 | Cooke .................. H04J 3/0638 370/350 |

FOREIGN PATENT DOCUMENTS

| | | |
|---|---|---|
| WO | WO-2010/003251 A1 | 1/2010 |
| WO | WO-2011/054006 A2 | 5/2011 |
| WO | WO-2013/085485 A1 | 6/2013 |

OTHER PUBLICATIONS

International Search Report for International Patent Application No. PCT/CA2015/050517, dated Sep. 18, 2015 (4 pages).
Supplementary European Search Report for European Patent Application 15864913, date of completion—Jun. 7, 2018 (9 pages).

* cited by examiner

SMALL CELL BACKHAUL

FIELD OF THE INVENTION

This invention relates generally to communications and, in particular, to backhaul communications for wireless access points.

BACKGROUND

Next Generation wireless networks (4G/LTE/LTE-Advanced) are being based on the premise of 100 Mb/s data transmission to the handset. Imagine being able to live stream 1080P HD video to your device anytime, anywhere, even as you are travelling by car (though not while in the driver's seat), bus, etc. Sounds like a great idea and many consumers don't understand why this isn't universally available right now at a reasonable price.

The wireless industry has worked persistently on getting the 3G standards, equipment & networks deployed and functioning, but high bandwidth applications like streaming HD video are generally beyond what those standards, equipment and networks were originally designed to handle.

While deploying faster 4G radios in the existing 3G network may provide some performance improvements, this may only provide a limited benefit. 3G networks are based on fairly large antenna base stations (BTSs). In much of the world, BTS sites have been upgraded with fibre optic network connections to be able to handle the more than 10× bandwidth/handset that 4G networks demand.

Unfortunately, that is not the whole story. If you take a 3G BTS site, it could handle a maximum bandwidth (limited by the combination of the speed and spectrum of the radios and the speed of the backhaul connection to the network) of perhaps 100 Mb/s with a fibre network connection and cover an area of perhaps 15-30 square kilometers.

This means that all the wireless devices within the 15-30 square kilometers can share that 100 Mb/s. In a downtown city core that capacity is exhausted very quickly and everyone gets very little bandwidth. If one of those people is using a device that needs all of that 100 Mb/s bandwidth, then it is not available to anyone else. You can see that the current 3G network architecture will simply not work for high bandwidth applications on any commercial scale. To achieve 4G speeds would generally require between 4-10× the number of 3G BTS sites. Given that each of those sites costs anywhere from $50,000 to $250,000, depending on the distance that the fibre has to be laid to reach it, you can see that this architecture is now non-economic.

SUMMARY

According to one aspect, the present invention provides an apparatus comprising: a local communication network interface to be operatively coupled to a local communication network; a switching module operatively coupled to the local communication network interface; a bonding interface, operatively coupled to the switching module, that enables communication over a bonded link; and a wireless communication module interface, operatively coupled to the switching module, the switching module being operable to receive communication traffic via the bonding interface, to determine whether the received communication traffic is to be forwarded to one or more of the local communication network interface and the wireless communication module interface, and to forward the received communication traffic in accordance with the determination.

According to another aspect, the present invention provides a network node comprising the apparatus described above.

According to yet another aspect, the present invention provides a method comprising: receiving communication traffic over a bonded link; determining whether the received communication traffic is to be forwarded to one or more of a local communication network and a wireless communication network; and forwarding the received communication traffic in accordance with the determination.

According to still another aspect, the present invention provides an apparatus comprising: a network interface to be operatively coupled to a main communication network; an access multiplexer to be operatively coupled to a network node; and an exchange gateway module, operatively coupled to the network interface and to the access multiplexer, and operable to receive communication traffic from the main communication network through the network interface, process the received communication traffic and forward the processed received communication traffic to the access multiplexer, wherein, for received communication traffic destined for the network node, the exchange gateway module is operable to process the received communication traffic destined for the network node so that the processed received network traffic destined for the network node is forwarded by the access multiplexer to the network node through a bonded link that is transparent to the access multiplexer. The bonded link is "transparent" to the access multiplexer in the sense that the access multiplexer is unaware of, and has no impact in the bonding of constituent links into a single bonded link. From the access multiplexer's perspective the constituent links are all independent point-to-point links on which it puts the requisite traffic. In some embodiments, the bonding is implemented at layer 2-3 in the main communication network, and therefore is 'transparent' to an access multiplexer operating at layer 1-1.5 of the main communication network. In some embodiments, the constituent links are xDSL pairs and the access multiplexer is a DSLAM.

According to a further aspect, the present invention provides a method comprising: receiving communication traffic destined for a network node from a main communication network; processing the received communication traffic destined for the network node to add a header to each packet of data in the received communication traffic destined for the network node; and forwarding each packet of data in the processed received communication traffic through a bonded link to the network node in accordance with its added header.

According to yet a further aspect, the present invention provides a communication system comprising: a main communication network; a plurality of network nodes, each network node of the plurality of network nodes being operatively coupled to the main communication network through a respective bonded link; a plurality of local communication networks, each of the local communication networks operatively coupled to a respective one of the network nodes, and comprising at least one subscriber communication node for providing a communication service to subscriber premises; and each network node of the plurality of network nodes comprising: a wireless communication module operable to establish one or more wireless communication links for wireless communication with one or more wireless communication devices in a respective coverage area; and a switching module that receives communication traffic from the main communication network via its respective bonded link, determines whether the received communication traffic is to be forwarded to one or more of its local communication network and its wireless communication module, and forwards the received communication traffic in accordance with the determination.

According to still a further aspect, the present invention provides a computer-readable medium storing instructions which when executed perform one of the methods described above.

BRIEF DESCRIPTION OF THE DRAWINGS

Examples of embodiments of the invention will now be described in greater detail with reference to the accompanying drawings.

DETAILED DESCRIPTION

Figure 1A:
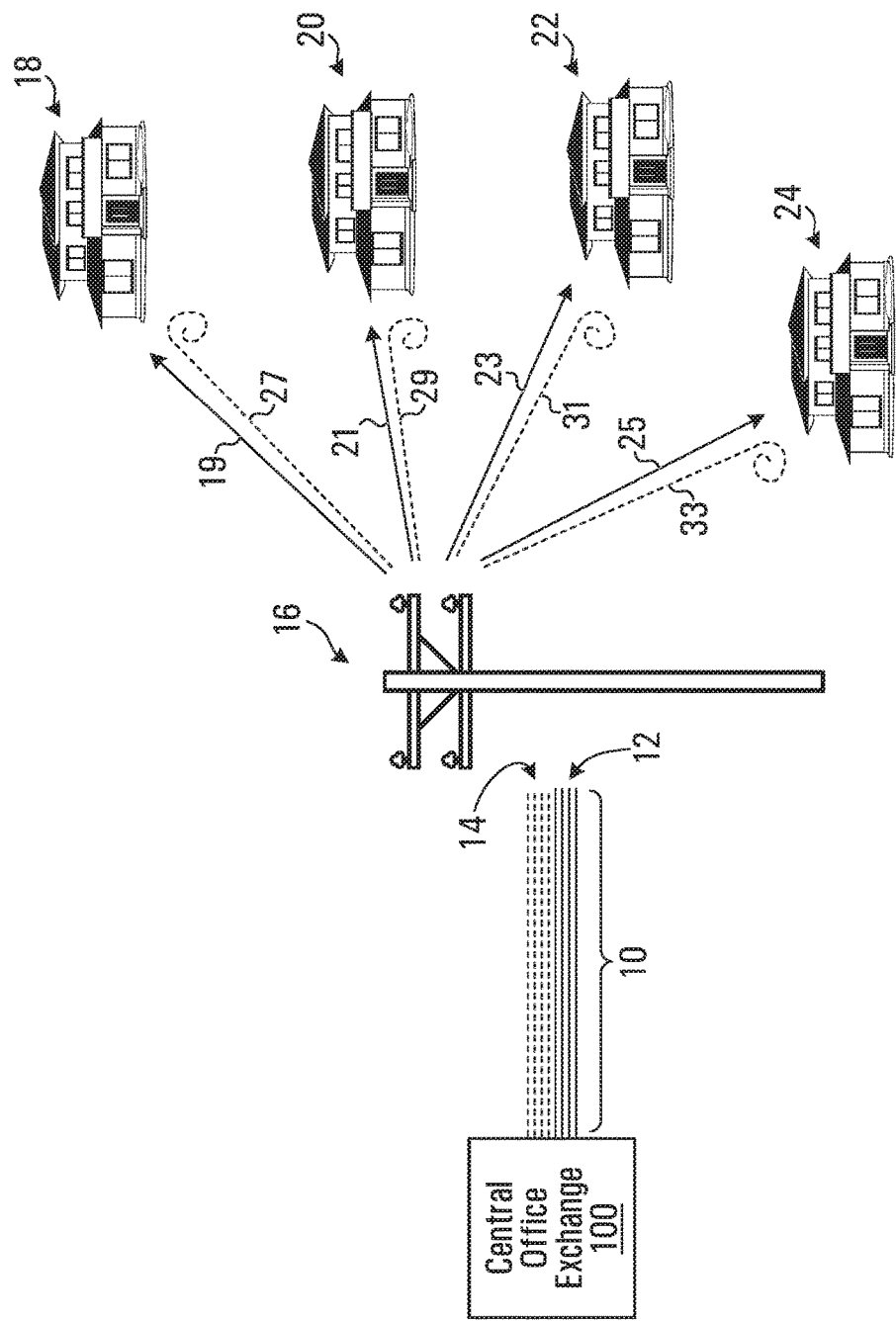
FIG. 1A is a block diagram of a common star topology for an access network connecting households and a Central Office (CO) exchange.

The rapidly accelerating consumption of mobile data is being driven by consumer adoption of smart phones, wearable devices and mobile-connected tablets, in parallel with 3G and 4G deployments. Cisco's VNI Mobile Data research found that that global mobile data will increase nearly 11-fold between 2013 and 2018, with traffic growing at a compound annual growth rate (CAGR) of 61 percent from 2013 to 2018, reaching 15.9 Exabytes per month by 2018. Whilst operators are keen to realize content and delivery revenues associated with mobile data growth, they recognize the challenge of developing networks that can accommodate future consumer demands.

The wireless industry has made a lot of progress since the original 3G standards were developed and 4G standards have been written and passed by international technical experts. The approach is to produce smaller BTS sites that are less expensive to deploy, are physically small with a smaller footprint, and have much lower transmit power, so that they cover a much smaller area. There would also need to be lots of them, perhaps up to fifty times more small sites than there are current BTS sites. These sites go by the names of microcells, femtocells, picocells or just small cells for short. The idea is that these small cells can be put almost everywhere to offload the BTS sites (called macrocells). In the future it is likely that the wireless networks that we use will be almost entirely based on small cells with the macrocells (BTSs) being used to 'fill the gaps' either between the small cells or in suburban and rural areas where the population density is lower. These small cells would be designed to handle perhaps 20-50 simultaneous users with a backhaul connection speed of 10-100 Mb/s.

The following are some examples of issues that may be considered when thinking about deploying small cells.

Physically small: in many cases, it may be desirable to make the small cell nodes physically small so that they are inconspicuous and can be placed on storefronts, lampposts and road signage, etc.

Low cost: The sheer number of them that may be deployed is much larger than the number of macrocells (BTSs) deployed for 3G networks.

Low transmit radio power: Having a large number of high power transmitters in any given area may cause large amounts of interference with each other. Lowering the power means that the mutual interference may be reduced and easier for mathematical interference cancellation techniques to handle within the capabilities of the low cost radios that may be used.

Backhaul bandwidth: As all communication with handheld devices is via the network, which provides the foundation of the Internet, typically the higher the bandwidth available to the small cell, the more simultaneous devices that can be supported by that small cell, and the fewer the number of devices that have to be handled by the macrocell network.

Availability of small cell power: The small cells need electrical power to be able to transmit their radio signals and to connect to the rest of the wired network.

There are many wireless backhaul-based solutions that need little more than a power source—in theory. They involve getting the traffic (voice, video & data) from one set of frequencies and putting them on another, generally unlicensed and less costly part of the spectrum. As the number of small cells increases, this creates more problems than it solves as you are just moving things around within a finite number of radio carriers whose regulations may change from country to country.

A number of powering options may be considered. Generally the interface at the base of the antenna of a radio is Ethernet which then feeds into a wired communications medium that takes in Ethernet packets and maps them into whatever protocol is used on that medium (e.g.: fibre may use SONET/SDH, xPON, Gigabit Ethernet, etc. and copper-based connections may be T1/E1, DOCSIS cable or xDSL-based). There is generally a lot of processing that takes place in BTS sites to cancel and/or compensate for interference, correct errors, manage the site, etc.

Many companies are concentrating on separating that processing from the physical antenna by putting fibre up the mast to the actual MiMo grid (fronthaul) and combining that processing power in a single site. However this needs fibre to be deployed to smaller, more power efficient sites which is often economically questionable due to the number of sites that will need fibre connectivity.

Optical fibre-based systems can carry a large amount of data, but are not physically deployed in the vast majority of locations that might need small cells. This means tunneling under roads, through gardens, etc. and that may involve legal intervention (to get the rights of way to do this), backhoes, cable pullers, etc. and a lot of time to get things in order.

For the above reasons, some major telecom carriers have said that they will not deploy optical fibre to support small cells as there is simply too much fibre that would be required and it would be uneconomic per small cell. In many cases, each small cell has to make a profit on its own for the operator to want to put it there and power it.

As there are fewer people using each small cell, the installation has to be economical, the equipment low-cost, and the access to the electrical power has to be affordable.

An example of how small cells may be deployed in accordance with an embodiment of the present invention will now be discussed with reference to FIGS. 1A to 1C.

FIG. 1A is a block diagram of a common star topology for an access network connecting households 18, 20, 22, and 24 and a Central Office (CO) exchange 100. In the star topology access network shown in FIG. 1A, houses 18, 20, 22, and 24 receiving services, such as Plain Old Telephone Service (POTS) and high speed internet access, such as DSL service, are connected to a telephone pole 16 via electrically conductive twisted wire pairs shown at 19, 21, 23, and 25 for houses 18, 20, 22, and 24, respectively. The telephone pole 16 in turn is connected to the CO exchange 100 via a twisted wire pair bundle 10 that includes a plurality of twisted wire pairs 12 that are utilized to provide service to the houses 18, 20, 22, and 24, as well as a plurality of spare twisted wire pairs 14 that are not being utilized to provide service to the houses. In many cases, telephone companies have deployed more than one twisted wire pair phone line per household, even if the household only utilizes one phone line. In FIG. 1A, such spare twisted wire pairs are shown at 27, 29, 31, and 33 for houses 18, 20, 22, and 24, respectively. These spare twisted wire pairs between the telephone pole 16 and the houses 18, 20, 22, and 24 at least partially account for the plurality of spare twisted wire pairs 14 between the telephone pole 16 and the CO exchange 100.

Figure 1B:
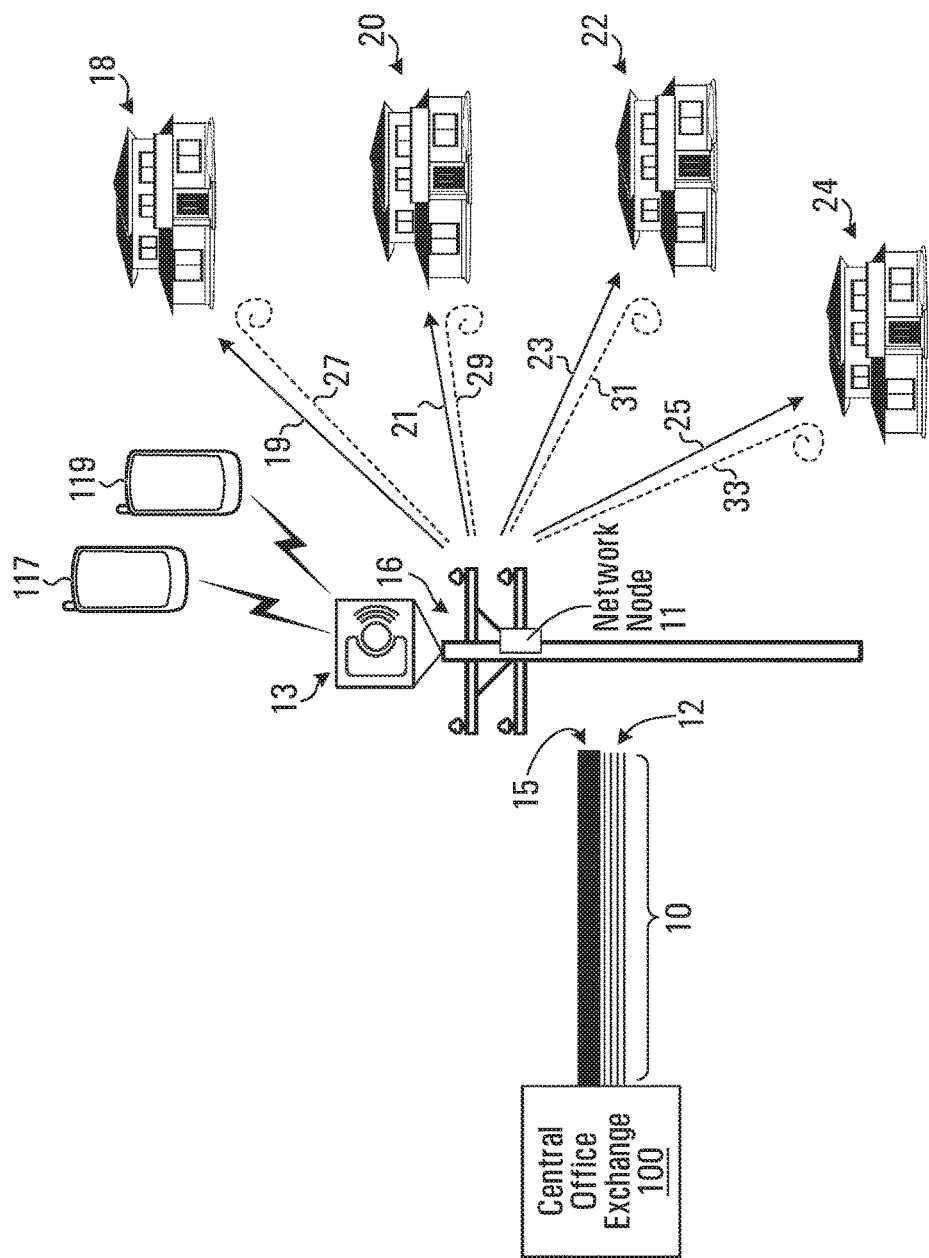
FIG. 1B is a block diagram of an example deployment of a small cell in the star network topology shown in FIG. 1A.

FIG. 1B is a block diagram of an example deployment of a small cell in the star network topology shown in FIG. 1A. In FIG. 1B, a small cell node 13 and a network node 11 are deployed at the telephone pole 16, with the small cell node 13 being operatively coupled to the network node 11, which in turn is coupled between the houses 18, 20, 22, and 24 and the CO exchange 100 via the existing twisted wire pair bundle 10 between the CO exchange 100 and the telephone pole 16 and the twisted wire pairs 19, 21, 23, and 25 between the houses 18, 20, 22, and 24 and the telephone pole 16.

In operation, the small cell node 13 provides wireless access to mobile devices 117 and 119, or any other device capable of wireless communication, within a coverage area. In the example deployment shown in FIG. 1B, the network node 11 provides a backhaul connection for the small cell node 13 through a bonded link 15 formed by bonding (taking multiple wire pairs and combining their bandwidth so that a single large bandwidth pipe can be realized) the spare twisted wire pairs 14 shown in FIG. 1A.

By using the same technology that provides household Internet access over telephone wires (Digital Subscriber Line or DSL—the latest version is VDSL2 which is capable of delivering up to 100 Mb/s over a single copper wire pair over short distances) and using the previously mentioned bonding approach, some embodiments of the present invention make it possible to provide significant amounts of backhaul bandwidth, and potentially electrical power, to small cells.

Copper is already deployed in telecom networks and has been for many years. Today there is often spare capacity (basically spare copper pairs that are part of a cable bundle deployed to serve a group of subscribers such as a small number of houses, apartments, or shops) but generally not enough to maximize telco revenue on their own (e.g. spare twisted wire pairs 14, 27, 29, 31, and 33 shown in FIGS. 1A and 1B). Deploying more copper cabling would cost almost as much as laying optical fibre—which telcos have indicated is uneconomical. Some embodiments of the present invention involve 'sharing' the cabling that currently serves the people it was originally deployed for.

Copper is a good electrical conductor so could be used as a part of a powering strategy as well. So-called 'line powering' has been around since the invention of the telephone and could be used to power small cells as well as multiplexing equipment—within reason.

In the example deployment shown in FIG. 1B, the backhaul traffic for the small cell node 13 and traffic associated with services provided to the local network of houses 18, 20, 22, and 24 is physically separated on the plurality of twisted wire pairs providing the bonded link 15 and the plurality of twisted wire pairs 12, respectively.

Figure 1C:
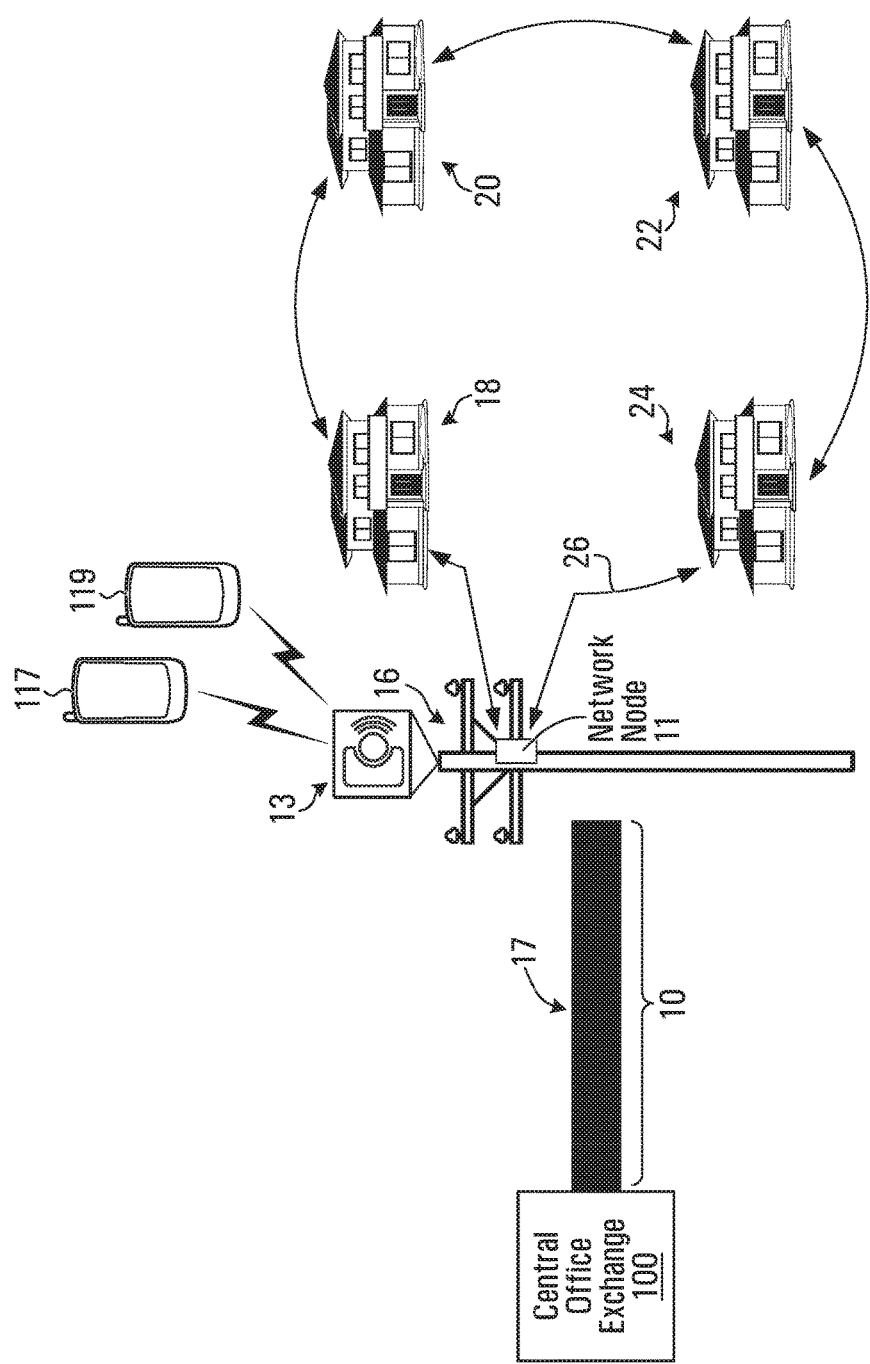
FIG. 1C is a block diagram of another example deployment of a small cell in conjunction with a local ring network topology connecting copper pairs between households and a network node with a bonded link between the network node and a CO exchange.

FIG. 1C is a block diagram of another example deployment of a small cell in conjunction with a local ring network topology where backhaul traffic for the small cell node 13 and traffic associated with services provided to the local network of houses 18, 20, 22, and 24 are both transmitted over a bonded link 17 between the network node 11 and a CO exchange 100.

In contrast to the deployment shown in FIG. 1B, in the example deployment shown in FIG. 1C the houses 18, 20, 22, and 24 have been interconnected with each other and the network node 11 in a ring topology to form a local ring network 26. Also, all of the twisted wire pairs of the twisted wire pair bundle 10 between the network node 11 and the CO exchange 100, including the twisted wire pairs 12 that were previously used to provide services to the houses 18, 20, 22, and 24 and the previously spare twisted wire pairs 14, have been bonded to provide the bonded link 17 between the network node 11 and the CO exchange 100.

By creating a "larger" (more twisted wire pairs) bonded link between the network node and the CO Exchange, the bandwidth capacity of the link can be increased. This bandwidth can then be shared between household subscribers on the local ring network and wireless devices receiving wireless access via the small cell node 13.

Further detailed example implementations of a network node, such as the network node 11, and equipment that may be installed at the CO exchange 100 and the households 18, 20, 22, and 24 will be discussed later with reference to FIGS. 2 to 7.

From the above, it can be seen that these example deployments of small cells involve deployment close to households. Mobile phone use within the home is increasing rapidly, which means that such deployments locate the small cell close to where many consumers use their mobile phones. While there may be insufficient spare capacity in the deployed copper infrastructure to achieve maximum revenue from small cells, some embodiments of the present invention combine the bandwidth carrying capacity of the people currently being served by that infrastructure (e.g. household telephone/DSL subscribers), via the previously mentioned bonding approach, to provide a backhaul connection, and in some cases remote powering, for small cell deployment.

It should be apparent from the foregoing that some embodiments of the present invention provide a feasible way to deploy a small cell near the homes of subscribers, which can be advantageous, as this increasingly is where the bandwidth is needed. It is estimated that 80% of mobile traffic is generated at the home, office or coffee shop.

In some embodiments, electrical power could be supplied to a small cell over the copper wiring from either the network, the households served with Internet access over that copper, or both. In some cases, a good delineation might be that the network provides sufficient power to keep the small cell going at all times but the households provide the additional power required for the wired Internet access.

In some embodiments, traffic bandwidth that is delivered to the small cell is combined with the Internet access that existing subscribers are already paying for. In some cases, the Internet access customers are also provided with a boost in performance as well through a shared bonded link with the main network.

In some embodiments, some level of Quality of Service (QoS) is provided to account for combining traffic that may have differing 'priorities' (e.g.: voice calls are generally more important than web surfing and emails).

In some embodiments, interference cancellation on the copper (vectoring) could be considered as part of the package, but its benefits may be lost after about 1 km from the DSLAM and may not be realized if a Local Loop Unbundling (LLU) situation exists in the network.

A small cell may have a more or less fixed amount of power that it will consume to provide coverage over a given physical area. In some embodiments, the network node deployed with the small cell node includes multiplexing equipment to terminate a number of DSL lines from the network, drive those network lines with the data from the houses as well as the small cell, and do all the processing of that data including, in some cases, applying a QoS scheme. Therefore, it may be desirable that a network node be very power efficient, yet capable of bonding many copper pairs into a single large data pipe and delivering high speed Internet access to the paying subscribers on the local communication network. If there are at least two pairs going to each house from the pedestal or distribution point (DP), such as the telephone pole 16 shown in FIGS. 1A to 1C, one of the ways to minimize power for the ports serving the wired customers is to utilize a ring architecture.

In some embodiments, essentially only two VDSL2 modems would face the customer premises of the local communication network at the pedestal/DP. A passive cross-connect could be used at the DP so that any household that turned their power off would be switched out of the ring. In a ring architecture, such as the local ring network used to interconnect the houses 18, 20, 22, and 24 shown in FIG. 1C, there is always a path to the network, even if one pair is cut to any of the houses in the ring—be it in one direction or the other. If the passive cross-connect is designed properly, those houses served by the ring can also provide power to the DP-based network node.

This is called back-powering. If it were not possible for whatever reason for enough electrical power to be provided to the network node via the network side of the copper at the DP, in many cases the combination of back-powering and line-powering may be more than sufficient.

DSL Add Drop Multiplexers (ADMs) & Rings, such as disclosed in U.S. patent application Ser. No. 11/463,240, filed on Aug. 8, 2006, and in U.S. Provisional Patent Application Ser. No. 60/706,022, filed on Aug. 8, 2005, the entire contents of both of which are incorporated herein by reference, represent a new and powerful reconfiguration of existing telecom network resources. Bonded DSL Rings that maintain their ability to be a source of communications in difficult technical circumstances, such as when power to homes and/or offices in which they are deployed fails, may make the most of these reconfigured resources.

Embodiments of the present invention may be applied, for example, to DSL Rings as disclosed in the above-referenced patent applications. Therefore, a brief description of bonded DSL Rings is provided below.

Those familiar with DSL communications will appreciate that in one known network topology for connecting copper pairs between households and a CO exchange, many households or customer sites are interconnected with a single CO exchange using twisted pair cables in a star network topology. The interconnection of the houses 18, 20, 22, and 24 and the CO exchange 100 in FIGS. 1A and 1B is one example of a star network topology. The interconnections between customer premises and a CO exchange are generally referred to as the "last mile".

The transmission bandwidth of technologies such as DSL and Ethernet decreases with distance. In a star network architecture, the DSLAM (DSL Access Multiplexer) may be physically located in the middle, but the distance to each subscriber is often greater than the short distance required for maximum bandwidth. Since the telecom carriers wish to increase bandwidth to their customers, they need to keep the twisted pair distances as short as possible.

Figure 2:
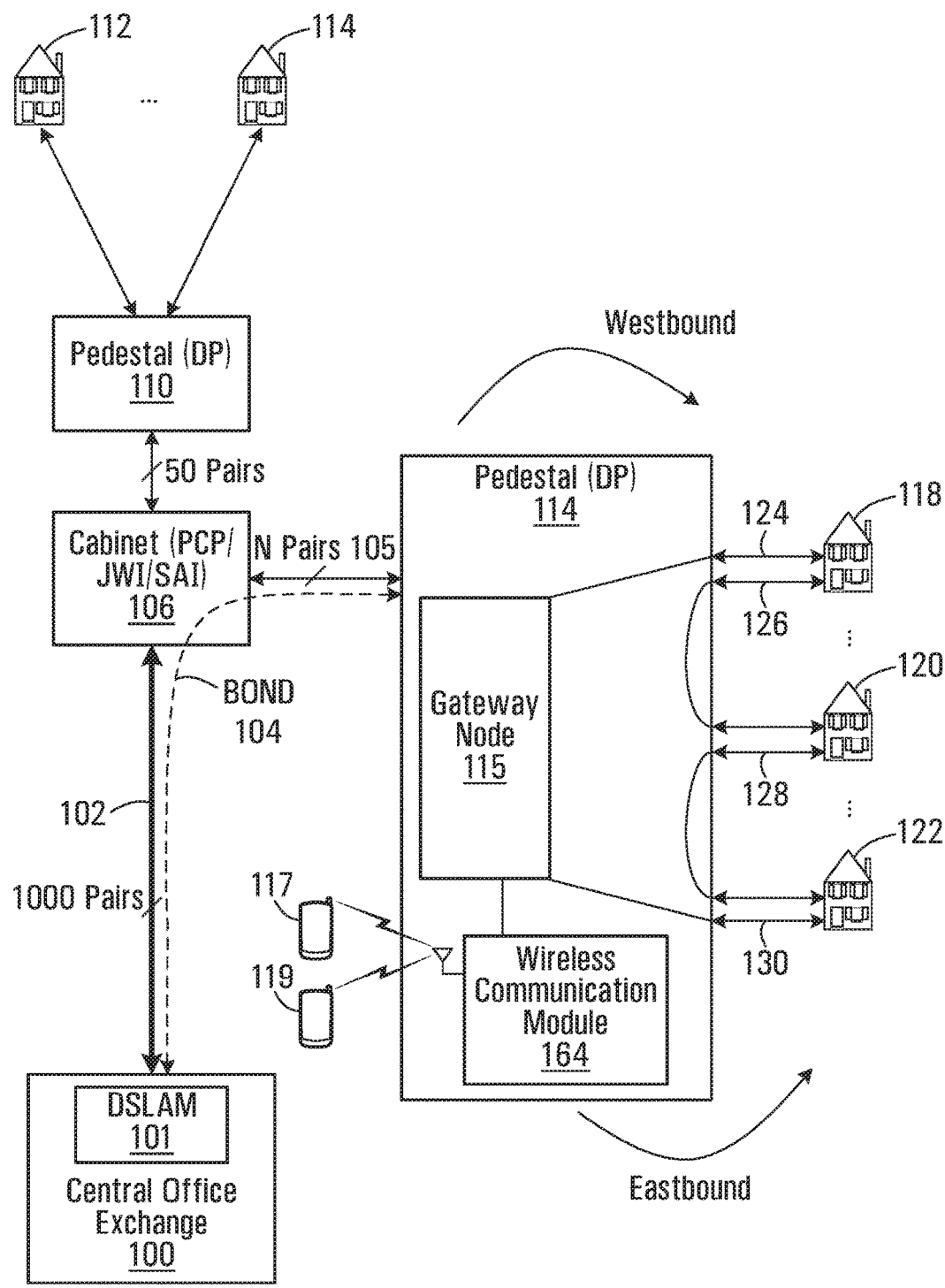
FIG. 2 is a block diagram of another more detailed example deployment of a small cell in conjunction with a local ring network topology.

Referring now to FIG. 2, an example of a DSL ring network that includes a small cell deployment provided by an embodiment of the invention will be described. A network node 115 forming part of the DSL ring is depicted in FIG. 2. The network node 115 may alternatively be referred to as a gateway node or a convergence node (CN). For illustrative purposes, an example deployment of such a gateway node 115 (for example forming part of a pedestal or DP (Distribution Point)) showing connections back to a central office 100 is depicted in FIG. 2, but it should be understood that gateway node 115 is not limited to such a deployment and any suitable backhaul connection may be employed. The gateway node 115 is shown connected via N Pairs 105 to a cabinet 106 (often called a Primary Connection Point—PCP—or Jumper Wiring Interface—JWI or Service Access Interface—SAI—depending on the terminology of the network operator), which in turn is connected to a CO 100 having a DSLAM 101 via 1000 pairs 102.

The gateway node 115 is connected to the CO 100 via the N Pairs 105 and N of the 1000 pairs 102 using a bonded connection 104, for example in a manner similar to that described in G. Bond (ITU 998.1/2/3); however, other bonding protocols may be used. For example, in some embodiments, a non-segmenting bonding protocol, such as mBond™ developed by Genesis Technical Systems Corp., may be used. Various bonding protocols, including those mentioned above, and their potential advantages and disadvantages are discussed in further detail below with reference to FIG. 7.

The number of pairs between the CO and a cabinet is arbitrary. It may, for example be on the order of several hundreds and maybe >1000. More generally still, where in the illustrated examples it is assumed that there is a bonded connection between the gateway and the upstream network element; any suitable shared connection can be used. The connection is shared in the sense that broadband packet traffic for multiple connected ADMs can be carried on the connection. The shared connection can include one or more of bonded copper, optical or wireless to name a few examples. For the purpose of comparison, also shown is a conventional pedestal 110 connected to households 112, 114 in a star topology.

A pedestal typically includes a number of incoming pairs from a network, and a patch panel that allows the connection of any pair going to a specific household to any of the incoming pairs. Thus for the conventional pedestal 110, the patch panel would allow households 112, 114 to be arbitrarily connected to respective ones of the 50 pairs incoming to the pedestal 110.

A set of households 118, 120, 122 is connected in a ring configuration. The first household 118 is connected via 124 to the gateway node 115 forming part of the pedestal or DP (Distribution Point) 114. Similarly, household 122 is connected via 130 to the gateway node 115. The remaining households are connected in a ring similar to that of FIG. 1C. Thus, a connection 126 is shown between households 118 and 120, and a connection 128 is shown between households 120 and 122. More generally, an arbitrary number of households would be included on the ring.

A wireless communication module 164, which may be a small cell node, is deployed at the pedestal 114 and is operatively coupled to the gateway node 115. The wireless communication module 164 provides wireless access to wireless communication devices 117, 119. While FIG. 2 shows two wireless communication devices, more generally any number of wireless communication devices may be included.

A bonding protocol 104 is used to obtain bandwidth from the CO 100 to the gateway node 115. Examples of bonding protocols that may be used in some embodiments include, but are not limited to, G. Bond and Ethernet in the First Mile (EFM). The gateway node 115, which may be environmentally hardened and powered via the twisted pairs from the CO 100, terminates the G. Bond 104 traffic and acts as a gateway for the DSL ring and the wireless communication module 164.

The gateway node 115 receives communication traffic over the bonded link 104, determines whether the received communication traffic is to be forwarded to the DSL ring or to the wireless communication access point established by the wireless communication module 164, and forwards the received communication traffic in accordance with the determination. In the reverse direction, the gateway node is operable to receive communication traffic from the wireless communication access point via the wireless communication module 164, and forward the received communication traffic from the wireless communication access point to the bonded link for transmission to the CO 100. This provides a backhaul communication link for the wireless communication module through the bonded link 104. Similarly, the gateway node 115 is operable to receive communication traffic from the DSL ring, and forward the received communication traffic from the DSL ring to the bonded link for transmission to the CO 100.

In some embodiments, the wireless communication module 164 provides small cell wireless access. In some embodiments, the wireless communication module 164 provides both small cell wireless access and WiFi access. In some embodiments, the wireless communication module includes multiple wireless communication modules. For example, in some embodiments, the wireless communication module 164 may include a small cell wireless communication module that provides small cell wireless access and a WiFi wireless communication module that provides WiFi access.

The gateway node 115 may implement a QoS mechanism when forwarding received communication traffic to/from the wireless communication module 164 and/or the DSL ring. In some cases, received communication traffic to/from the wireless communication module may be forwarded with a higher QoS priority than received communication traffic to/from the DSL ring.

The gateway node 115 may implement a QoS mechanism by determining a QoS priority of the received communication traffic and forwarding the received communication traffic in accordance with its determined QoS priority. In some cases, the QoS mechanism is implemented using one or more of: RPR (Resilient Packet Ring), Ethernet, and VDSL2 (Very high bit rate Digital Subscriber Line—Version 2).

The gateway node 115 may translate the received communication traffic before forwarding it. For example, received communication traffic from the bonded link 104 containing data destined for one or more of the wireless devices 117, 119 may be translated by the gateway node 115 to a format that is compatible with the wireless communication module 164 before being forwarded to the wireless communication module 164. A similar translation, but in reverse, may be done for communication traffic received from the wireless communication module 164 before being forwarded to the bonded link 104. Corresponding translations may be done for passing communication traffic between the bonded link 104 and the DSL ring.

In some embodiments, where a local power source is unavailable or for some reason unfeasible, the gateway node 115 may be at least partially powered remotely from one of the components in the main communication network, to which it is coupled through the bonded link 104, and/or from one or more of the communication nodes on the DSL ring. The gateway node 115 may also or instead have one or more local power sources, such as power mains, a solar or other power cell, and/or a battery. In some cases, the battery may be charged by the power mains or remotely from at least one of the main communication network and the DSL ring. U.S. Provisional Patent Application Ser. No. 60/977,381, filed on Oct. 4, 2007, and U.S. patent application Ser. No. 12/243,061, filed on Oct. 1, 2008, the entire contents of both of which are incorporated herein by reference, disclose methods and apparatus for the remote powering of nodes, which may be used in some embodiments of the present invention.

For the pedestal 114 that is participating in the DSL ring, only pairs 124 and 130 are connected to the gateway node 115. The remaining connections are between adjacent households. This can be achieved by making connections on a patch panel that forms part of the pedestal 114. For example, the interconnection 126 between households 118 and 120 can be achieved by connecting a jumper cable between a first pair going from the pedestal 114 to the first household 118, and a second pair going to the second household 120. In this manner the configuration of the DSL ring is very flexible and can easily be changed by simply modifying the set of patches which may be done via a passive cross-connect in the DP.

In the illustrated example, the bandwidth from the CO 100 to the gateway node 115 is provided through a bonding approach. In particular, a set of pairs from the DSLAM 101 can be grouped as a logical pipe that provides higher bandwidth than individual pairs. This logical pipe is then used to transmit packets to and from the gateway node 115, any of the households on the DSL ring, and any of the wireless communication devices that are provided with wireless network access through the wireless communication module 164. For example, assuming individual pairs between the DSLAM 101 and the gateway node 115 support 4 Mb/s each, this being a function of the distance between the DSLAM 101 and the gateway node 115, and 32 such pairs can be combined to produce 128 Mb/s bandwidth, this bandwidth may be shared by the subscribers on the DSL ring and the wireless communication devices that are provided with wireless access through the wireless communication module 164. Regarding the availability of double the maximum VDSL2 bandwidth, home routers may be able to handle less than this amount, for example 100 Mb/s. This would not pose a problem so long as there is not more than that amount of traffic to drop at a given household or the household had high capacity equipment such as a GigE router. The maximum current VDSL2 ring bandwidth in a symmetrical implementation is just over 200 Mb/s.

While throughout this description copper pairs are referred to, more generally any electrically conducting twisted wire pairs and possibly other types of connections can be employed. As detailed above, each household 118, 120, 122 has an add drop node (not shown in FIG. 2) that provides packet add/drop functionality. The location of such ADMs is not limited to being in households. In a particular example, the add drop node is an HCC (Home Communications Centre), which enables DSL ring topologies in telecom service provider networks. An example HCC is described in detail below with reference to FIG. 6. A 'Ring' is a special case of the more general 'Daisy Chain of ADMs' where the 'Ring' goes out from, and returns to, the same gateway node, which may, but need not necessarily be, a CO. Another example would be a set of ADMs between two different COs or even a serially-connected network 'stub' sometimes referred to as a linear ADM (i.e., a set of ADMs that initiates from a particular gateway node, but terminates at another gateway node).

By physically, electrically, and/or logically connecting the twisted pair cables of customers on the DSL ring so that the electrical distance is less than the maximum bandwidth distance of the layer 1 technology, service can be provided to subscribers at much greater distances from the DSLAM with very little investment in additional "last mile" cabling. Twisted pair rings greatly increase the distance and bandwidth carrying capability of the 'local ring'. High bandwidth is made available to the households on the ring by reducing the transmission distance to that between households instead of between households and gateway nodes or Central Offices. Maximum bandwidth on the ring is obtained if the distance between houses connected together is less than the maximum bandwidth distance. The high bandwidth that is provided to the ring through the bonded link to the DSLAM 101 in the CO 100 can then be used in a shared manner with the subscribers on the ring to provide a backhaul connection for the wireless communication module 164.

In some embodiments, existing "last mile" cables are utilized by the ring network. Existing "last mile" cables may include several copper pair wires bundled together extending out from a CO to several households. Copper pair wires may exist between households, but are connected between the household and the CO. By appropriately cutting a copper pair wire between a second house downstream in the cable from a first house and the CO and routing the cut end to a second house, a connection between two households is established using the existing cable. This process may be repeated to form complete ring network topologies. There may exist intermediate, non-powered technician access points in the larger cables.

In some implementations, a complete package of services with a documented feature evolution is implemented for subscribers on the ring. The complete package may for example include combinations of features such as Internet Home Theatre or Internet Protocol TeleVision (IPTV), Automatic Meter Reading (AMR), Home Security Monitoring, Virtual Private Networking, Internet Security and Connection Maintenance (i.e., platform updates performed without customer intervention), and Medical Aid Monitoring, to name but a few.

The above description has focused on a ring topology for a local communication network. However, it is to be understood that a ring topology is not required. More generally, any appropriate topology interconnecting communication nodes may be implemented to establish the local communication network to provide services to subscribers. An example of another topology that could be employed is a linear ADM or "Daisy Chain" topology. A linear ADM topology may be implemented whereby a set of communication nodes is connected together in series. A ring topology is a topology in which two end communication nodes are interconnected.

In some embodiments, at each node in the ring is a full ADM, based for example on VDSL2. The DSL transmission distance starts at zero again on each individual hop. In most cases these hops back to the gateway node and then to the neighbour's house are less than 300 meters (<1000 ft). VDSL2 bandwidth at this distance is in the ≥100 Mb/s range (depending on the VDSL2 chipset manufacturer's specifications and the cable quality).

With rings there are two paths into and out of each house, each with the potential capability of carrying >100 Mb/s. Therefore the bandwidth potential for this scenario is potentially greater than 200 Mb/s (100 Mb/s eastbound and 100 Mb/s westbound) depending on the number of bonded pairs and the actual distance from the DSLAM to the pedestal. Basically the greater the number of subscribers on the ring, the greater the bandwidth pool available due to the greater number N of pairs available for bonding in the bonded link 104 stream.

Rings also have the advantage of protecting themselves such that, if a single pair on the ring is cut, the traffic can be sent in the opposite direction to get to the gateway node. This is useful for maintenance purposes as well as adding and removing nodes (houses) to/from the ring. This allows for a deployment business case based on customer demand which eliminates the sunken investment in a 'build it and they will come' approach. This is also true of bonding so that houses can be added to the ring as subscribers sign up for the service. In addition, in some embodiments, a gateway node may include cross-connect elements (CCEs), such as those described in International Application PCT/CA2014/050145 filed on Feb. 28, 2014, the entire content of which is hereby incorporated by reference, that can connect and disconnect individual households from the ring.

In some embodiments, Local Loop Unbundling (LLU) is accomplished. In some embodiments this is achieved using the logical separation that is currently done via co-location in the CO (i.e., the traffic is carried by the incumbent from the customer to the CO and then handed off). In other embodiments, another gateway node is installed in a pedestal or distribution point along with co-location in the CO. The pedestal could be a PCP/JWI/SAI (Primary Connection Point/Jumper Wiring Interface/Service Access Interface). This allows for physical separation of the rings on a carrier-by-carrier basis. Space considerations in the pedestal may become an issue depending on the number of carriers that need to be supported in this fashion. A more pragmatic approach would have competitive carriers paying for the CPE (customer premises equipment) and jumper installation in the pedestal.

In another embodiment, a wireless interface can be used through which the reach of the wireline local communication network can be extended to reach other subscriber devices not connected directly by wireline connections. A second set of households can be connected in a similar manner as described for the ring network of houses described in previous embodiments, with wireline connections between pairs of households in a linear manner that might form a ring or linear ADM for example. At least one of the households of the second set has a wireless connection to one of the households of the first set on the ring, to thereby connect the second set of households into the ring.

In some embodiments, a wireless interface is available for performing protection switching in the local communication network in the event of failure of one or more wireline connections.

In some embodiments, a wireless connection can be used between the endpoints of two linear ADM topologies to complete a ring topology in the local communication network.

In some embodiments, the ring transmission protocol is based on the IEEE 802.17 RPR standard with some modifications to allow for different possible bandwidths between nodes and overall lower peak bandwidths. RPR was designed for metro optical networks. Ethernet-based rings, implementing Ethernet Automatic Protection Switching (EAPS) according to ITU-T Recommendation G.8031/Y.1342, for instance, are also contemplated.

In some embodiments, packet add/drop functionality is included in each node to add/drop packets. More generally, traffic add/drop functionality is included. This might include packet add/drop functionality, or traffic implemented using timeslots or wavelengths/frequencies to name a few specific examples. QoS could also be accomplished using dedicated pairs for different traffic priorities as an example.

This description contains many references to DSL communication. This may for example be ADSL (Asynchronous DSL), ADSL2+(Asynchronous DSL Version 2+), SDSL (Symmetric DSL), Uni-DSL (Universal DSL), VDSL (Very high bit rate DSL), and VDSL2 (Very high bit rate DSL version 2) or a future iteration of DSL that may or may not include Dynamic Spectrum Management (DSM) functionality. However, other broadband communications protocols may alternatively be employed. For example, G.SHDSL and Vectoring are other possible technologies.

As noted above, embodiments of the present invention may be applied to DSL rings. It should be appreciated, however, that FIG. 2 and the foregoing description are intended solely as illustrative examples of the types of networks or topologies in conjunction with which embodiments of the invention may be implemented. Thus, the present invention is not necessarily limited to any particular types of network, topology, equipment, or protocols, for instance.

Figure 3:
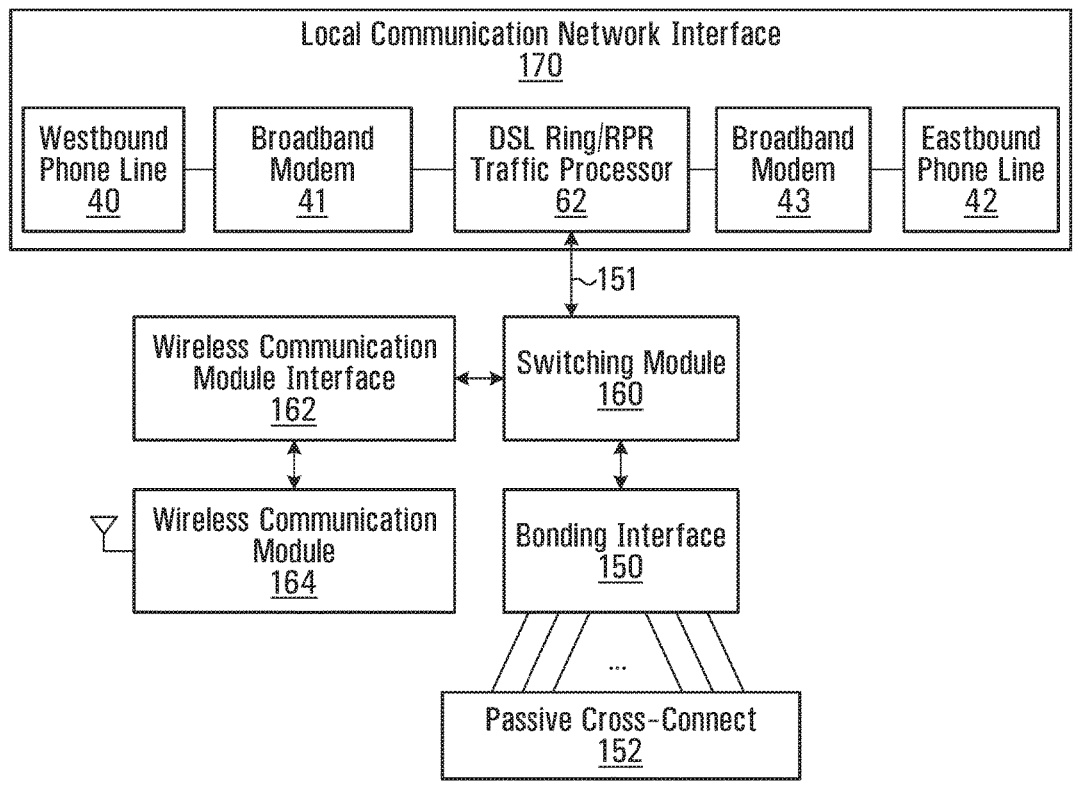
FIG. 3 is a block diagram of an example network node.

FIG. 3 is a detailed block diagram of an example implementation of a network node, such as the gateway 115 of FIG. 2. Common reference numbers are used where appropriate. The example network node shown in FIG. 3 includes a local communication network interface 170, a switching module 160 operatively coupled to the local communication network interface 170, a bonding interface 150 operatively coupled to the switching module 160, and a wireless communication module interface 162 operatively coupled to the switching module 160. The wireless communication module interface 162 is operatively coupled to a wireless communication module 164, and the bonding interface 150 is operatively coupled to a passive cross-connect 152.

The local communication network interface 170 provides an interface for the network node to be operatively coupled to a local communication network, such as the ring network that includes houses 118, 120, 122 in FIG. 2. The local communication network interface 170 is coupled to a westbound phone line 40 and an eastbound phone line 42. References to "eastbound" and "westbound" do not of course necessarily imply east or west, but simply the two directions that the ring can be connected to a given network node. Each phone line has a pair of wires, typically but not necessarily copper. The local communication network interface 170 has a broadband modem 41 coupled to the westbound phone line 40 and another broadband modem 43 coupled to the eastbound phone line 42. A DSL Ring/RPR (Resilient Packet Ring) traffic processor 62 (a specific example of an ADM) is coupled to both the broadband modem 41 and the broadband modem 43. An add/drop port 151 of the traffic processor 62 is coupled to the switching module 160.

In some embodiments, the broadband modems 41 and 42 are VDSL2 modems.

In operation, the bonding interface 150 enables communication over a bonded link through the twisted pair punch panel 152. The wireless communication module 164 is configured to establish one or more wireless communication links for wireless communication with one or more wireless communication devices. The switching module 160 receives communication traffic via the bonding interface 150, and determines whether the received communication traffic is to be forwarded to the local communication network interface 170 for transmission on the local communication network and/or to the wireless communication module interface 162 for wireless transmission by the wireless communication module 164. The switching module 160 then forwards the received communication traffic in accordance with its determination. The switching module is also configured to receive communication traffic from the wireless communication module 164 via the wireless communication module interface 162, and forward the received communication traffic from the wireless communication module to the bonding interface 150 for transmission to the main network. Similarly, the switching module 160 is configured to receive communication traffic from the local communication network via the local communication network interface 170, and forward the received communication traffic from the local communication network to the bonding interface 150 for transmission to the main network.

In some embodiments, the switching module 160 is further operable to provide a translation function to translate the received communication traffic. In some cases, the translation function can include a function to translate the received communication traffic between RPR (Resilient Packet Ring) and Ethernet or ATM (Asynchronous Transfer Mode). For example, in some embodiments, the wireless communication traffic coming to the network node from the wireless communication module 164 will be Ethernet-based, which may then be encapsulated in RPR to provide QoS and then re-encapsulated in Ethernet to pass through a DSLAM.

Figure 4:
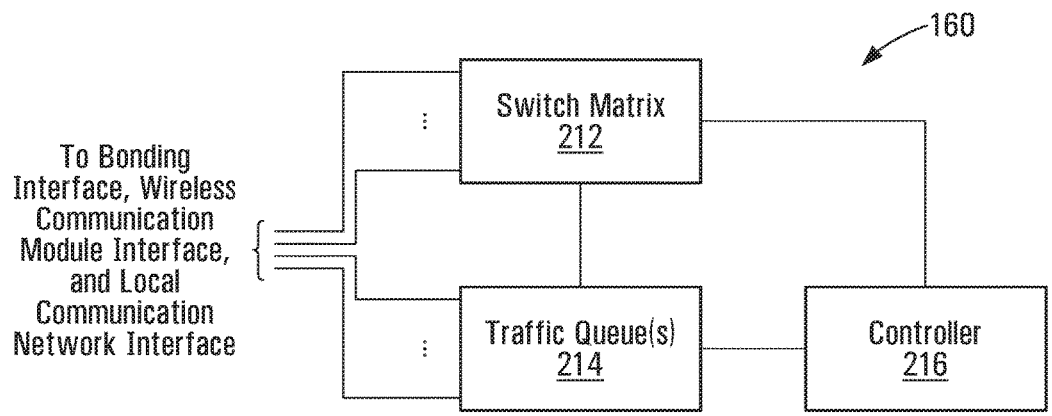
FIG. 4 is a block diagram of an example switching module that might be included in a network node, such as the example network node shown in FIG. 3.

FIG. 4 is a block diagram of an example implementation of the switching module 160 shown in FIG. 3. The switching module 160 shown in FIG. 4 includes a switch matrix 212 operatively coupled to the bonding interface, to the wireless communication module interface, and to the local communication network interface. The switching module 160 also includes a controller 216, operatively coupled to the switch matrix 212, and a set of one or more traffic queues 214 operatively coupled to the bonding interface, to the wireless communication module interface, to the local communication network interface, and to the switch matrix 212.

In operation, the one or more traffic queues 214 store received communication traffic from the bonding interface, the wireless communication module interface, or the local communication network interface, and the controller 216 controls the switch matrix 212 to switch the stored received communication traffic between the bonding interface, the wireless communication module interface, and the local communication network interface, in accordance with the determination described above.

In some embodiments, the set of one or more traffic queues 214 comprises receive queues for storing the received communication when received, and transmit queues for storing the received communication traffic prior to forwarding. In some cases, the received communication traffic is forwarded from the set of one or more queues.

In some embodiments, the controller 216 is further operable to provide QoS forwarding for the received communication traffic, which may involve, for example, forwarding received communication traffic to/from the wireless communication module interface 162 with a higher QoS priority than received communication traffic to/from the local communication network interface 170.

In some embodiments, the network node may include a powering arrangement (not shown in FIG. 3) that enables the network node to be at least partially powered remotely by the main communication network through the plurality of electrically conductive twisted wire pairs at the bonding interface.

Figure 5:
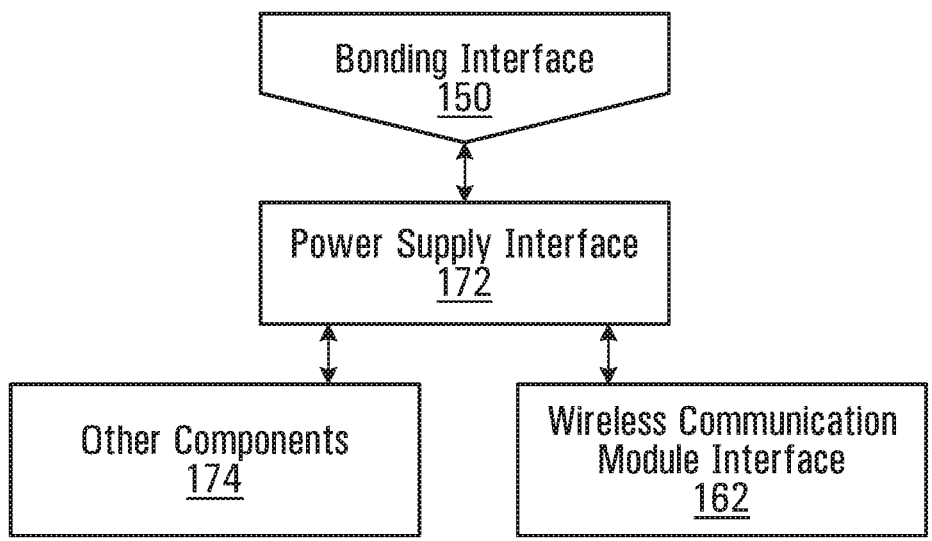
FIG. 5 is a block diagram of an example powering arrangement that might be included in a network node, such as the network node shown in FIG. 3, to provide remote powering from a main network.

FIG. 5 is a block diagram of an example powering arrangement that might be included in a network node, such as the network node shown in FIG. 3, to provide remote powering from a main network.

The powering arrangement shown in FIG. 5 includes a bonding interface 150 and a power supply interface 172 operatively coupled to the bonding interface 172. For the purposes of this example, it is assumed that the bonding interface 150 is coupled to the main network through a plurality of electrically conductive twisted wire pairs, over which the main network is able to provide electrical power to the bonding interface. The main network may provide electrical power in the form of a DC offset on some of the wire pairs that are also used for communication traffic and/or on wire pairs that are dedicated for power delivery. In some embodiments, the dedicated power pairs may also provide synchronization information/reference(s).

The power supply interface 172 receives the electrical power provided by the main network and utilizes it to at least partially power components at the network node. The power supply interface 172 may filter and convert the electrical power provided by the main network into electrical power supplies for components of the network node itself, generally indicated as "Other Components" 174 in FIG. 5, and/or peripheral components or modules that may be coupled to the network node, such as the wireless communication module 164 shown in FIGS. 2 and 3. For example, the power supply interface 172 may utilize the electrical power provided by the main network to provide an electrical power supply to the wireless communication module 164 through a Power-over-Ethernet (PoE) connection via the wireless communication module interface 162.

In some cases, the powering arrangement enables the node to be powered from a local power source (not shown), or remotely from the main network as a backup to the local power source.

In some embodiments, the power supply interface may also be operatively coupled to the local communication network interface 170 to receive electrical power provided by one or more of the communication nodes in the local communication network.

It is to be understood that other implementations of the network node are possible. In the illustrated example, specific example interfaces are shown. However, more generally, any suitable interface or combination of suitable interfaces may be implemented. Also in the illustrated example, processing is accomplished using a specific implementation of processors, controllers and memory. More generally, processing may be accomplished using any appropriate implementation of software, hardware, firmware, or any appropriate combination of software, hardware and firmware.

Figure 6:
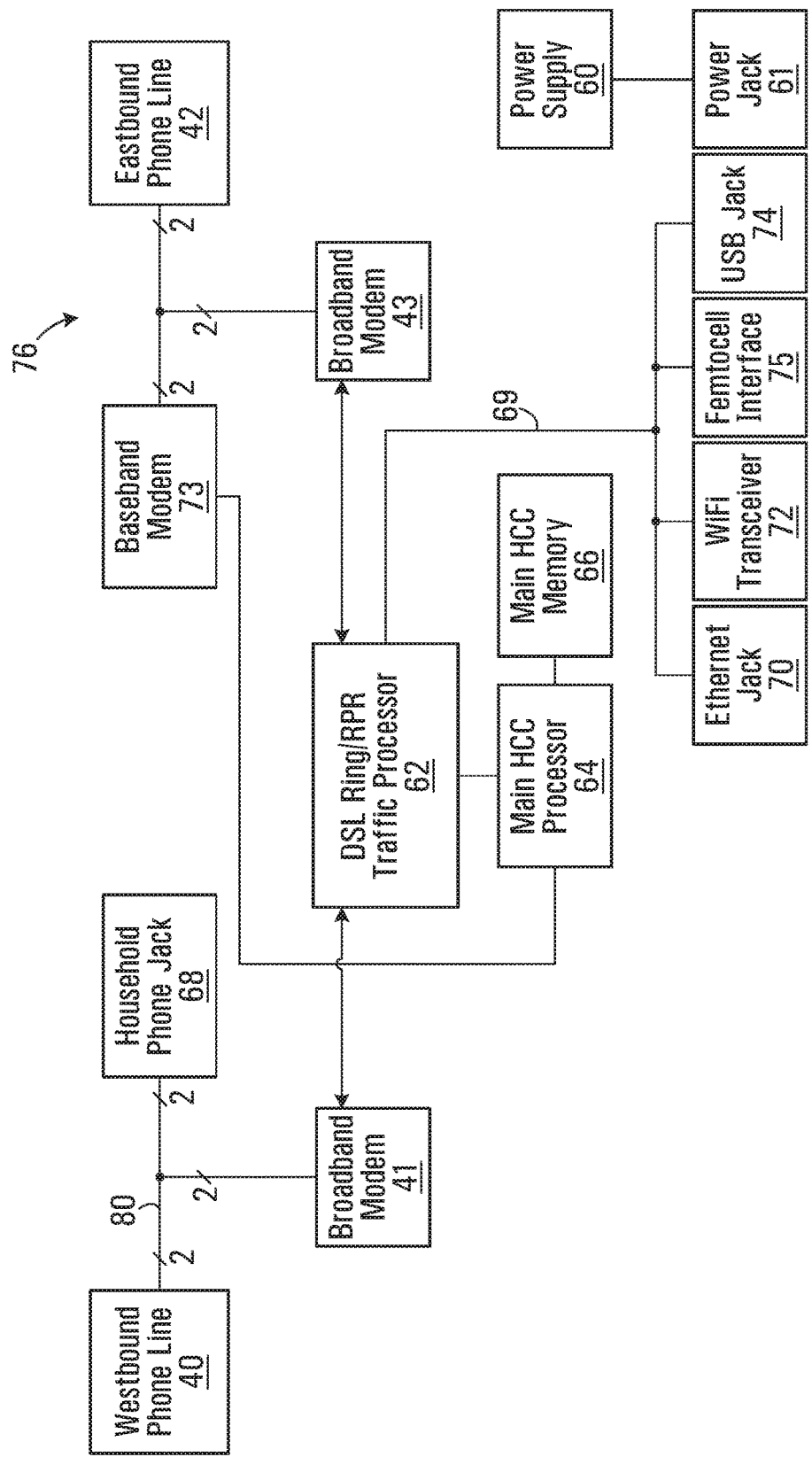
FIG. 6 is a block diagram of an example HCC (Home Communications Centre).

Referring now to FIG. 6, shown is a block diagram of another example HCC (Home Communications Centre) generally indicated at 76. It is to be understood that the HCC 76 shown in FIG. 6 is very specific for example purposes only. In general, equipment in conjunction with which an HCC may be implemented may include fewer, further, or different components, interconnected in a similar or different manner than shown.

The HCC 76 is coupled to a westbound phone line 40 and an eastbound phone line 42. References to "eastbound" and "westbound" do not of course necessarily imply east or west, but simply the two directions that the ring can be connected to a given HCC. Each phone line has a pair of wires, typically but not necessarily copper. The HCC has a DSL Ring/RPR (Resilient Packet Ring) traffic processor 62 (a specific example of an ADM) coupled to the westbound phone line 40, for example through VDSL2 modem 41 (more generally a broadband modem), and coupled to the eastbound phone line 42, for example through VDSL2 modem 43 (more generally a broadband modem). The HCC also has a main HCC processor 64 and a main HCC memory 66 accessible by the main HCC processor 64. The main HCC processor is also connected to the DSL Ring/RPR traffic processor 62. A power supply 60 is coupled to a power jack 61. A household phone jack 68 is connected to the westbound phone line 40. In some embodiments, there is a relay/switch that connects to a VoIP capability that is disabled when the power fails. A baseband modem 73 is connected to the eastbound phone is also connected to the main HCC processor 64. Other possible interfaces include an Ethernet jack 70 a WiFi transceiver 72, a femtocell interface 75, and a USB jack 74. There may be other components, but they are not shown for sake of simplicity. The traffic processor 62 has add/drop ports 69 that connect the various interfaces to the traffic processor.

In operation, the combination of the DSL Ring/RPR traffic processor 62, the main HCC processor 64, and the main HCC memory 66 is adapted to process all communications over the westbound phone line 40 and/or the eastbound phone line 42. Processing communications includes packet add/drop functionality. For example, if the DSL Ring/RPR traffic processor 62 receives a packet on the westbound phone line 40, it may handle the packet if it is addressed to the present HCC 76, or forward the packet to its destination via the eastbound phone line 42 if it is addressed to another HCC. In some implementations, packets are routed on a per packet basis. The HCC 76 may also generate packets associated with a local communication device and forward the packets to their destination. In some embodiments, protection switching of traffic is handled by an industry-standard protocol designed specifically for this task. An example of this would be RPR (IEEE 802.17)

technology. RPR was developed for the optical transport infrastructure, but might also be adapted to fit well into this application.

There are two twisted copper pairs: the westbound phone line 40, and the eastbound phone line 42 (i.e., in opposite directions). In some implementations, communication over a phone line is bi-directional. In some embodiments, the data rate is symmetrical (i.e., transmit bit rate=receive bit rate) for both eastbound and westbound directions. In some embodiments, flow control mechanisms are used so that the data rate is the same around the ring and so that there are no links that are faster than others. A given household may communicate with the CO by an eastbound path and/or a westbound path. Communications with households may also be through a wireless mesh overlay via the WiFi and/or femtocell interfaces 72, 75, to provide for wireless backhaul for instance. In some implementations, if communication on a ring via one direction is not possible, then communication via the other direction is attempted.

The household phone jack 68, the Ethernet jack 70, the WiFi transceiver 72, and the femtocell interface 75 provide communication interfaces for the household. The USB jack 74 may, in addition to providing a further communication interface, enable memory expansion and maintenance access for the HCC 76 when it is installed. The HCC 76 may be installed in a residence or business premises and remains with the residence/business premises permanently. This can be used to enable AMR (automatic meter reading) functionality, for instance. In some implementations, the architecture combines existing home phones with mobile phones. This may for example include most recent and/or backward compatible wireless interfaces. In some embodiments, the HCC 76 has one or more wireless interface(s), for example the WiFi (IEEE 802.11 a/b/g/n) interface 72 and femtocell interface 75 to enable communication with wireless devices, such as wireless appliances, stereos, PCs, TVs, meters, mobile phones, Set Top Boxes (STBs), etc.

In some implementations, QoS (Quality of Service) is provided so as to provide certain communications with greater priority than other communications. A list of example communications with decreasing priorities may be VoIP (Voice over Internet Protocol) communication, streaming video communication, Internet Gaming, Business Services and non-streaming data communication. Having a greater priority provides streaming communication with a greater likelihood of being uninterrupted and having less latency and/or jitter. In some implementations, a COS (class of service) is used as detailed in the RPR specification so as to prioritize traffic on the ring. This enables carriers to sell what are referred to as SLAs (Service Level Agreements) to their customers based on traffic volume at each priority level. For example, customer A might get X GB/month of Priority 1 traffic and Y GB/month of Priority 2 traffic, etc. while customer B may get totally different traffic profiles.

In some embodiments, the HCC 76 is partially powered from the phone lines so there is no dependency on household current supply for landline-based phone service. In some implementations, the household phone jack 68 and the traffic processor 62 are powered by phone line 42 while the remaining components may be powered by household current (i.e., would have to be 'plugged in'). For example, phone line 42 could supply power via the potential difference between the first copper wire 78 at −48V and the second copper wire 80 at 0V in a DC-based architecture. Other examples of DC-based architectures that may be used in some embodiments are driven at +/−190 VDC.

In some embodiments, the traffic processor 62 controls the traffic that is on the ring via the RPR protocol and VDSL2 standards. For such implementations, it also controls the VDSL2 interface chips. It will also control bandwidth asymmetry and any protection switching activity, for instance. The main processor 64 might for example implement functions such as the firewall/VPN, control of the WiFi interface, control communications with the network, access rule implementations (e.g. user authentication, WiFi interface logical segmentation between users, SLA policing, etc.), possibly interface conversions as necessary (e.g.: USB), etc.

The number of HCCs that may be interconnected in a ring network is implementation specific. An example design consideration is the maximum number of HCCs that can be partially powered solely from the phone line so as to enable high impedance user devices to operate during a power failure. A low current consumption user device is a user device that does not draw a significant amount of current and can be powered solely by a phone line. A telephone that does not require a power connection is an example of a low current consumption user device. Under normal conditions, each HCC is plugged in so that it receives power from its household power. However, during a power failure, the household power may be absent. In some embodiments, the HCC has a local power supply that receives power from the phone line so that during a power failure the local power supply partially powers the HCC and powers a high impedance user device so that the user may operate the high impedance user device. In such implementations, a user is provided with at least basic telephony functionality during a power failure.

The ring topology and the HCC may involve modification to the "last mile". The "last mile" has been seen as 'untouchable' for many reasons. First, it provides the customer with the perception that the bandwidth they have is not shared with other customers. This is true only until the traffic reaches the first access multiplexer in the network. From that point onwards all bandwidth is shared. Second, the star topology allows the telecom carrier to provide power to older 'black' telephones (e.g.: those that do not have power cords) so that phone calls can still be made during a power failure. In some implementations, the HCC takes this into account and offers the capability to be powered from the telecom carrier Central Office (CO). Another possible option would be to provide support for baseband POTS and implement each ring in the form of a DSL frequency overlay with DSL communication run in frequencies above baseband POTS, so that in the event of a power failure existing network POTS switches can be allowed to handle it. In such implementations, the CO would be providing power through the network node that is coupled to the local communication network, such as the gateway 115 shown in FIG. 2. In some implementations, examples of which are discussed above, the HCC 76 may instead provide electrical power to the network node in a back powering arrangement.

Having a star topology means that no one else can 'listen' to another's phone calls, as there is no one else in the transmission path. In some implementations, the HCC provides similar capability via encryption. Regarding the encryption of traffic, in some embodiments all traffic is encrypted around the ring so that no one will be able to 'listen' to another's traffic. The encryption may be end-to-end in nature (e.g.: between a user's PC and a server somewhere on the Internet) or simply around the ring as far as the gateway node (which will remove the encryption prior to sending it to the DSLAM in the CO).

It is to be understood that other implementations of the HCC are possible. In the HCC 76, specific example interfaces are shown. In one particular example, an HCC has an Internet firewall/VPN (Virtual Private Network), 2 or 3 phone jacks (RJ11), a USB port for memory expansion and maintenance access, a WiFi interface, a femtocell interface and one or more Ethernet cable jacks (RJ45). However, more generally, any suitable interface or combination of suitable interfaces may be implemented. Also in the illustrated example, processing is accomplished using a specific implementation of processors and memory. More generally, processing may be accomplished using any appropriate implementation of software, hardware, firmware, or any appropriate combination of software, hardware and firmware. The minimum functionality that needs to be included in each communication node is a traffic add/drop function. In the above example this is implemented in the traffic processor 62 but other implementations are possible.

Figure 7:
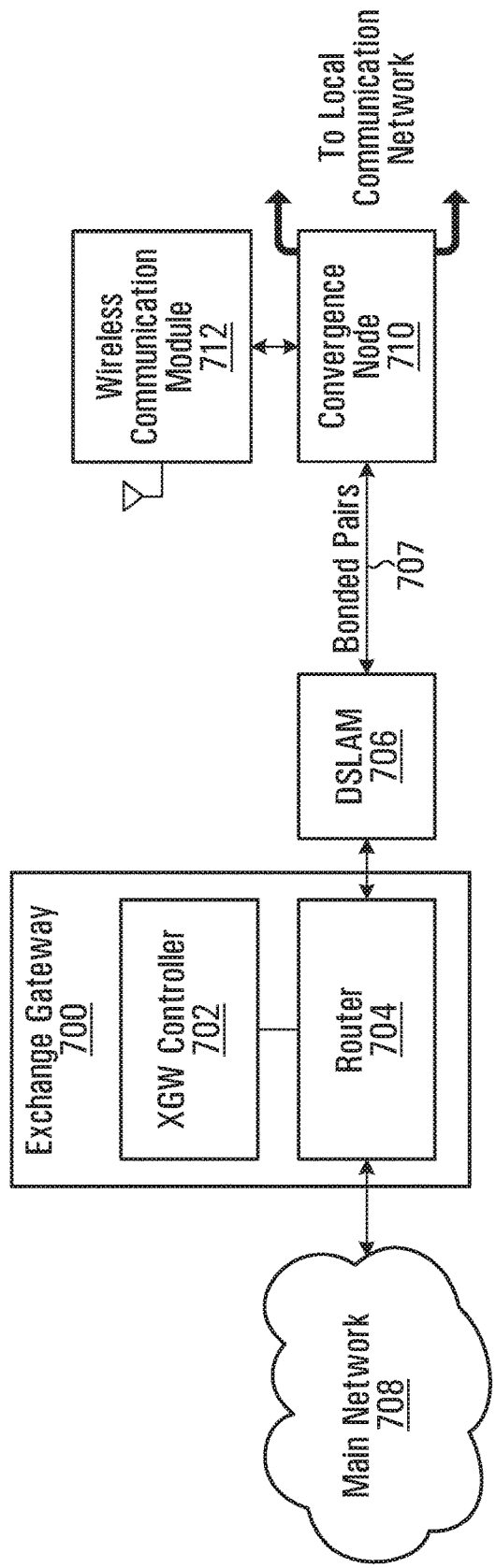
FIG. 7 is a block diagram of another example deployment of a small cell in conjunction with a network node coupled to a local communication network.

FIG. 7 is a block diagram of another example deployment of a small cell in conjunction with a network node coupled to a local communication network in accordance with an embodiment of the present invention. The example deployment shown in FIG. 7 shows further details of main network side equipment behind the DSLAM.

A convergence node 710 forming part of the local communication network is depicted in FIG. 7. The convergence node 710 may alternatively be referred to as a gateway node or more generally as a network node. For the purpose of example, an example deployment of such a convergence node 710 (for example forming part of a pedestal or DP (Distribution Point)) showing connections back to a main network 708 is depicted in FIG. 7, but it should be understood that convergence node 710 is not limited to such a deployment and any suitable backhaul connection may be employed. The convergence node 710 is shown connected via bonded wire pairs 707 to a DSLAM 706. In some embodiments, the DSLAM 706 may be located at the CO or at a fiber-fed network node/cabinet of the network operator. A DSLAM is just one example of a type of access multiplexer that may be used in some embodiments of the present invention. More generally, embodiments are not limited to DSL communication links, and therefore other types of access multiplexers may be used in other embodiments.

The convergence node 710 is connected to the DSLAM 706 using a bonded connection. The number of pairs between the DSLAM and the convergence node 710 is implementation specific. It may, for example be on the order of several hundreds and maybe >1000. More generally, where in the illustrated example it is assumed that there is a bonded connection between the convergence node 710 and the upstream network element, any suitable shared connection can be used. The connection is shared in the sense that broadband packet traffic for multiple nodes can be carried on the connection. The shared connection can include one or more of bonded copper, optical or wireless to name a few examples.

A wireless communication module 712, which may be a small cell node, is deployed so that it is operatively coupled to the convergence node 710.

While FIG. 7 shows only one convergence node 710, more generally any number of convergence nodes may be coupled to a DSLAM.

A bonding protocol is used to obtain bandwidth from the DSLAM 706 to the convergence node 710. The convergence node 710, which may be environmentally hardened and powered via the twisted pairs from the DSLAM 706, terminates the bonded traffic and acts as a gateway for the local communication network and the wireless communication module 712.

On the main network side, the DSLAM is operatively coupled to a router 704 that is also operatively coupled to an exchange gateway controller 702 and to the main network 708. In some embodiments, a main network interface (not shown) may provide an interface between the main network 708 and the router 704. Together the exchange gateway controller 702 and the router 704 act as an exchange gateway (XGW) 700 for the main network 708. The exchange gateway controller 702, the router 704 and the DSLAM 706 may be implemented in hardware, firmware, one or more components, such as a processor, that execute software, or some combination thereof. For example, the exchange gateway controller 702 may be implemented as software executed on a server in a telco network.

For illustrative purposes and for the sake of brevity only one convergence node 710 and one DSLAM 706 are shown in FIG. 7. More generally, an exchange gateway, such as the exchange gateway 700 shown in FIG. 7, can potentially support multiple convergence nodes through multiple DSLAMs.

In operation, the exchange gateway 700 receives communication traffic destined for the convergence node from the main network 708. For example, the communication traffic destined for the convergence node 710 may be for the wireless communication module 712 and/or the local communication network. The exchange gateway 700 also processes the received communication traffic destined for the network node 710 so that the processed received network traffic destined for the network node is forwarded by the DSLAM to the network node through the bonded link 707 in a manner that is transparent to the DSLAM. In particular, in some embodiments, the exchange gateway controller 702 controls the router 704 to add a header to each packet of data in the received communication traffic destined for the network node 710 so that the processed received network traffic destined for the network node is forwarded by the DSLAM to the network node through the bonded link 707.

Because the bonded link 707 is transparent to the DSLAM 706, the DSLAM 706 can be implemented using a DSLAM that may not support bonding natively. This can be particularly advantageous in that it may allow re-use of existing DSLAMs when deploying small cell nodes.

In some cases, the constituent pairs/links in the bonded link 707 may not train up at the same training rate across the bonded link, meaning that certain pairs/links may be faster than others. The G. Bond standard specifies a maximum training rate difference of 4:1, meaning that the fastest line can be no more than 4× the speed of the slowest line. This has to do with the size of memory that is needed to re-assemble packets at the other end of a bonded link. G. Bond & EFM (Ethernet in the First Mile, which is very similar to G. Bond) both segment incoming packets. For example, if there are 4 lines in the bonded link, every packet is broken up into 4 equal sized pieces (some implementations change the relative size of the pieces based on the relative training rates) and send a different piece, possibly with padding, simultaneously down each twisted pair. When the pieces get to the other end, they are all 'glued' back together and the original transmission sequence is maintained. Unfortunately, while this approach increases the bandwidth that is available by a factor which is slightly less than the number of pairs/links used, it also has a number of distinct disadvantages:

It is not scaleable.

It is not resilient to line-outage.

To be practical, it also requires that the final bandwidth of the pairs/links that are used be within a specific percent of each other to make the amount of memory and processing at the receiver feasible.

It implies that there has to be a significant amount of memory at both ends (if the individual links are bi-directional) in order to reassemble the packet fragments, and this memory requirement generally increases geometrically with the number of pairs/links (i.e.: this approach can get expensive very quickly—meaning that the cost per pair/link gets higher and often becomes uneconomical at higher pair/link counts).

In contrast, in some bonding protocols, such as the mBond™ bonding protocol developed by Genesis Technical Systems Corp., full packets may be sent down a link with no segmentation. This approach has several potential advantages that may mitigate at least some of the drawbacks discussed above that may be associated with bonding techniques that involve packet segmentation. In particular, bonding protocols that involve sending full packets down a link without segmentation may offer the following potential advantages:

This approach is nearly infinitely scalable. There is no theoretical upper limit to the number of individual DSL pairs/links that can be used. There may be practical limitations, however, such as the number of DSL pairs/links available, cost, power consumption, and physical size, for example.

If a bonded link uses n pairs, then the system can be configured to readjust itself in the event of the loss of one or more constituent pairs/links, albeit with a lower bandwidth, but with potentially no further loss of traffic. Similarly, if the lost pair/link is repaired, the system can be configured to automatically readjust to include that pair/link once it becomes available for use. In actual use it is possible to remove up to (n−1) lines simultaneously and, although there may be loss of traffic initially, the system can be configured to recover to use just the remaining line while the other pairs/links remain unavailable.

There is no limitation governing the bandwidth ratio of individual pairs across the bonded link. As discussed in further detail below, this approach allows various bonding topologies to be employed for assigning packets to the constituent pairs/links of the bonded link to mitigate against the effect of a poor (e.g. slower training rate), but operational, constituent pair/link.

Ingress packets are not split into smaller pieces in this approach, meaning that the entire packet is maintained throughout the process. This can potentially allow for a lower memory requirement and, potentially, lower latency particularly that introduced in the receiver.

One of the consequences of bonding protocols in which full packets are sent down a link without segmentation is that packets can get out of order. That is, at the far end, packets may be received in a different order than in which they were transmitted. This may not necessarily be important as usually the higher layers of the application make allowance for this by means of retransmission request and "jitter buffers". In general the Internet is a Best Efforts service and there is no guarantee of packet order maintenance across any link. However in some of the legacy transmission modes (such as video over UDP) it can have a dramatic negative impact.

To remedy this, a memory/buffer may be added at both ends of a bonded link (potentially increasing the delay that the system adds to the traffic that traverses it), and a number may be put on each packet as it arrives so that at the receiver packets that are received out of sequence can be re-sequenced. This sequence number may be added as part of a custom header that is added to each packet.

The numbered packets may then be sent to the other end of the bonded link, where they are stored in a memory and read out in their numerical order.

However, this approach impacts the delay on ALL packets traversing the bonded link, and not all packet streams/types may be sensitive to OoS packets. As such, it may be desirable in some cases to provide configurability, for example through software, to enable or disable this feature as some systems may not care about packet order due to the Best Efforts nature of the Internet. For example, in some implementations this feature may be enabled for packets that are sensitive to packet order (e.g.: packets may be inspected to interpret the traffic type field in each packet and, if it could be sensitive to packet order, it is put though the numbering process described above), while letting the rest of the packets traverse the system in a more efficient fashion based, for example, on the pair/link training rates. This may minimize system delay for the vast majority of packets, while adding delay to a small subset of packets that are sensitive to packet order.

Re-sequencing packets at the receiver has the effect of adding further latency. In applications where latency is critical, it may be desirable to provide an operator with the option to bypass re-sequencing, thus allowing the packets to be transmitted at the customer end in the order they arrived at the receiver rather than the order in which they were originally sent.

In the mBond™ bonding protocol developed by Genesis Technical Systems Corp., each ingress Ethernet packet is checked and passed into a frame buffer and back-end semaphores are updated. Packets are then taken from the frame buffer in sequence and passed to the next available modem interface (corresponding to one of the constituent pairs/links of the bonded link) where a custom header is added and a new Frame CheckSum (FCS) is calculated before being passed to the corresponding modem of the DSLAM for transmission. Part of the custom header added to each packet by the transmit logic is a sequence number. With reference again to FIG. 7, the addition of sequence numbers by the Exchange Gateway 700 prior to transmission to the convergence node 710 over the bonded link 707 can allow the bonding interface at the convergence node 710 to re-sequence received packets so that they can be retransmitted to the customer application (e.g. an application on a customer communication node connected to the local communication network or an application a wireless subscriber connected wirelessly through the wireless communication module 712) in the same order in which they were originally transmitted over the bonded link 707.

Even with the addition of a memory/buffer for packet re-sequencing, it is noted that in many cases the mBond™ protocol can be used with a smaller memory at the receiver than would be necessary for carrying out the de-segmentation of packets associated with alternative bonding protocols like G. Bond and EFM where packets are received in segments over multiple pairs/links and reconstructed.

In some cases, for traffic that may be particularly sensitive to OoS affects, all the packets that are meant for a single destination that are sensitive to packet order can be sent down a single pair/link in the bonded link. This means that there is no benefit to that traffic of being part of a bonded link, but packet order is maintained for that traffic.

In some cases, packets that are sensitive to delay can be sent down multiple pairs/links in the bonded link, as long as transmission order is maintained and the pairs/links they are sent down have similar training rates.

In bonding protocols such as mBond™, where full packets are transmitted over constituent pairs/links of a bonded link, there are many other potential bonding "topologies" that may be used to determine over which constituent pair/link a given non-segmented packet is to be transmitted. Three examples of such bonding topologies are discussed below, including a round-robin topology, a priority driven topology and a weighted topology. It is to be understood that these are provided for illustrative purposes only, and embodiments of the invention are in no way limited to these particular examples.

Round-Robin

In the round-robin bonding topology the modems corresponding to the constituent pairs/links are accessed in sequence in an order which can be specified by the operator.

Upon receipt of a packet semaphore, a check is performed to check that the next modem in the sequence is ready to receive, and if so the packet is forwarded to the next modem in the sequence. As noted above, in the mBond™ bonding protocol the packet will have been first modified to include a custom header and a new FCS will have been calculated.

The round-robin topology may be best suited for implementations where the final bandwidths of the constituent pairs/links are substantially equal.

Priority Driven

A priority driven topology may be slightly more complex than the Round Robin topology in that the operator can define a constituent pair/link order based upon final bandwidth. For example, faster pairs/links can be assigned higher priorities and slower pairs/links can be assigned lower priorities.

In this topology, upon receiving a packet semaphore, a check may be performed to check that the modem interface associated with the pair/link that has been defined as having the highest priority is available. If so, the packet will be forwarded there, otherwise a further check may be performed to determine the availability of the modem interface defined as having the next highest priority and so on.

In some implementations, for every packet the foregoing check starts at the modem interface associated with the pair/link having the highest priority. If the pairs/links are assigned priorities based on their final bandwidths/training rates, with faster pairs/links assigned relatively higher priorities, then this approach has the potential advantage that the pair/link with the fastest final bandwidth may carry the most traffic and those with the lowest final bandwidth the least. Also, this approach may be advantageous in that each pair/link may have less idle time between packets, which means that this approach may make for a more efficient use of available bandwidth.

However, priority driven topologies have the potential disadvantage in that they are a relatively high-maintenance solution, meaning that the potential advantages discussed above may not be realized without regular updating of the assigned priorities to take into account potential changes to the final bandwidths/training rates of the constituent links/pairs. For example, if a pair/link fails, is repaired and retrains at a different (usually lower) rate than previously, it would generally be advisable to reassign the priority order for the system to take into account the new training rate, because continuing to assign packets to the repaired pair/link according to a priority level that was assigned based on its previous training rate could potentially lead to less than optimum performance.

Weighted

A weighted topology may be slightly more complex than either the round-robin or the priority driven topologies in that the modem interface to which a packet is assigned for transmission is determined based on the packet length as well as a priority that may be assigned by an operator.

In this topology, as with the priority driven topology, a priority may be assigned based upon the trained rate of each modem interface, but in this topology the priorities are assigned in groups. For example, the constituent pairs/links may be grouped according to their training rates, with a first group made up of those constituent pairs/links having training rates above a first threshold, a second group made up of those constituent pairs/links having training rates between the first threshold and a second lower threshold, and a third group made up of those constituent pairs/links having training rates less than the second threshold. It should be appreciated that the number of groups and the criteria determining how constituent pairs/links are allocated to those groups is implementation specific. For example, in some implementations there may be more than three groups, while in other implementations there may be only two groups. Alternatively, rather than allocating the constituent pairs/links according to thresholds, the constituent pairs/links may simply be equally divided into groups, with, for example, the fastest ⅓ of the constituent pairs/links being allocated to a first group, the next fastest ⅓ of the constituent pairs/links being allocated to a second group, and the remaining ⅓ being allocated to a third group.

The concept of this topology is that, when a packet becomes available for transmission, it is assigned to one of the groups based on the length of the packet. For example, in implementations that include three groups of constituent pairs/links grouped according to their training rates (e.g.: a fast group, a medium group, and a slow group), packets may be assigned to the groups such that packets with relatively long lengths are assigned to the fast group made up from the fastest pairs/links, packets with medium lengths are assigned to the medium group, and short packets are assigned to the slow group.

In some implementations, once a packet is assigned to one of the groups, a further topology may be utilized within the group to determine the constituent pair/link to which packet will be assigned within the group. For example, in some implementations, a round-robin or a priority driven topology may be used within a group.

The weighted topology has potential advantages in mitigating the amount of Out of Sequence (OoS) packets that could otherwise arise from packets of different lengths being spanned across lines of different rates affecting a customer's Quality of Experience (QoE). For example, short 64-byte packets can be sent down pairs/links in the slow group of pairs/links and longer packets (up to 1536-bytes for example) can be sent down pairs/links in the fastest group of pairs/links. This may allow smaller memories to be used and may reduce the delay added through the system.

In addition to the data processing features of the exchange gateway discussed above, in some embodiments the exchange gateway can also serve as the control/management of the system in one or more of the following ways:

Can serve as the upgrade download server for subtending CNs/mBonds/HCCs (i.e.: when a software update is needed to any of those components, the XGW can store the software upgrade and download it to the individual boxes in the most efficient manner—generally when there is lower traffic demand on the system—and do it in the background), where an mBond is a node that uses bonding technology to communication over a bonded link in a manner similar to that of a CN, but without a local communication network subtending from it (as in the case of a CN).

Can act as an aggregation point for Network Management System/Element Management System/Operational Support System/Business Support System (NMS/EMS/OSS/BSS) alarms, warnings, etc. from mBonds/CNs/HCCs Can provision mBonds/CNs/HCCs according to parameters provided by the Telcos Can monitor conditions that are provisioned on the mBonds/CNs/HGWs Can provide inventory data on the subtending deployed mBonds/CNs/HGWs (e.g.: equipment types, serial numbers, software release levels, etc.) to the NMS/OSS/BSS From that above it should be appreciated that, in some embodiments, the XGW adds a data plane (packet data processing) in an EMS-type function in the main communication network.

What has been described is merely illustrative of the application of principles of embodiments of the invention. Other arrangements and methods can be implemented by those skilled in the art without departing from the scope of the present invention.

We claim:

1. An apparatus comprising:
   a local communication network interface to be operatively coupled to a local communication network;
   a switching module operatively coupled to the local communication network interface;
   a bonding interface, operatively coupled to the switching module, that enables communication over a bonded link, wherein the bonded link comprises a plurality of constituent links; and
   a wireless communication module interface, operatively coupled to the switching module,
   the switching module being operable to receive communication traffic via the bonding interface, to determine whether the received communication traffic is to be forwarded to one or more of the local communication network interface and the wireless communication module interface, and to forward the received communication traffic in accordance with the determination,
   the bonding interface being operable to:
     group constituent links of the bonded link into groups according to their training rates;
     assign each group a relative priority, with groups of constituent links having relatively higher training rates being assigned relatively higher priorities and groups of constituent links having relatively lower training rates being assigned relatively lower priorities; and
     forward communication traffic over the bonded link by sending whole packets over one or more constituent links of the bonded link without segmentation, wherein some of the constituent links may train up at different training rates across the bonded link, and sending whole packets over one or more constituent links of the bonded link without segmentation comprises routing whole packets over one or more constituent links of the bonded link based at least in part on at least one of: packet size; constituent link training rate; and packet data type,
   wherein routing whole packets over one or more constituent links of the bonded link based at least in part on at least one of: packet size; constituent link training rate; and packet data type comprises sending whole packets over one or more constituent links of the bonded link according to a weighted bonding topology by assigning each whole packet to one of the groups of constituent links based on its packet size and the relative priorities assigned to the groups.

2. The apparatus of claim 1, wherein the bonding interface is further operable to:
   assign the constituent links within each group relative priorities within the group based on their training rates, with constituent links having relatively higher training rates being assigned relatively higher priorities within the group and constituent links having relatively lower training rates being assigned relatively lower priorities within the group; and
   after assigning a whole packet to one of the groups of constituent links, route the whole packet over one or more of the constituent links of the group according to a priority driven bonding topology within the group.

3. A method comprising:
   receiving communication traffic over a bonded link, wherein the bonded link comprises a plurality of constituent links;
   determining whether the received communication traffic is to be forwarded to one or more of a local communication network and a wireless communication network;
   forwarding the received communication traffic in accordance with the determination;
   grouping constituent links of the bonded link into groups according to their training rates;
   assigning each group a relative priority, with groups of constituent links having relatively higher training rates being assigned relatively higher priorities and groups of constituent links having relatively lower training rates being assigned relatively lower priorities; and
   forwarding communication traffic over the bonded link by sending whole packets over one or more constituent links of the bonded link without segmentation, wherein some of the constituent links may train up at different training rates across the bonded link, and sending whole packets over one or more constituent links of the bonded link without segmentation comprises routing whole packets over one or more constituent links of the bonded link based at least in part on at least one of: packet size; constituent link training rate; and packet data type,
   wherein routing whole packets over one or more constituent links of the bonded link based at least in part on at least one of: packet size; constituent link training rate; and packet data type comprises sending whole packets over one or more constituent links of the bonded link according to a weighted bonding topology by assigning each whole packet to one of the groups of constituent links based on its packet size and the relative priorities assigned to the groups.

4. The method of claim 3, further comprising:
   receiving communication traffic from the wireless communication network; and
   forwarding the received communication traffic from the wireless communication network to the bonded link.

5. The method of claim 3, further comprising:
receiving communication traffic from the wireless communication network;
determining whether the communication traffic received from the wireless communication network is to be forwarded to one or more of the local communication network and the bonded link; and
forwarding the communication traffic received from the wireless communication network in accordance with the determination.

6. The method of claim 3, further comprising:
receiving communication traffic from the local communication network;
determining whether the communication traffic received from the local communication network is to be forwarded to one or more of the wireless communication network and the bonded link; and
forwarding the communication traffic received from the local communication network in accordance with the determination.

7. The method of claim 3, wherein the forwarding comprises forwarding further in accordance with a QoS (Quality of Service) mechanism.

8. The method of claim 7, wherein the forwarding comprises forwarding received communication traffic to/from the wireless communication network with a higher QoS priority than received communication traffic to/from the local communication network.

9. The method of claim 3, wherein the bonded link comprises a DSL (Digital Subscriber Line) link, and wherein the local communication network comprises nodes operatively coupled together through DSL links.

10. The method of claim 3, further comprising:
assigning the constituent links within each group relative priorities within the group based on their training rates, with constituent links having relatively higher training rates being assigned relatively higher priorities within the group and constituent links having relatively lower training rates being assigned relatively lower priorities within the group; and
after assigning a whole packet to one of the groups of constituent links, routing the whole packet over one or more of the constituent links of the group according to a priority driven bonding topology within the group.

11. A communication system comprising:
a main communication network;
a plurality of network nodes, each network node of the plurality of network nodes being operatively coupled to the main communication network through a respective bonded link; and
a plurality of local communication networks, each of the local communication networks operatively coupled to a respective one of the network nodes, and comprising at least one subscriber communication node for providing a communication service to subscriber premises;
each network node of the plurality of network nodes comprising:
a wireless communication module operable to establish one or more wireless communication links for wireless communication with one or more wireless communication devices in a respective coverage area; and
a switching module, operatively coupled to the wireless communication module, that receives communication traffic from the main communication network via its respective bonded link, determines whether the received communication traffic is to be forwarded to one or more of its local communication network and its wireless communication module, and forwards the received communication traffic in accordance with the determination;
wherein the main communication network comprises:
an access multiplexer to be operatively coupled to one or more of the network nodes of the plurality of network nodes; and
an exchange gateway module, operatively coupled to the access multiplexer, and operable to receive communication traffic, process the received communication traffic and forward the processed received communication traffic to the access multiplexer,
wherein, for received communication traffic destined for one of the network nodes, the exchange gateway module is operable to process the received communication traffic destined for the network node so that the processed received network traffic destined for the network node is forwarded by the access multiplexer to the network node through the network node's respective bonded link in a manner that is transparent to the access multiplexer,
wherein the exchange gateway module comprises:
a router, operatively coupled to the access multiplexer; and
an exchange gateway controller, operatively coupled to the router, that, for received communication traffic destined for one of the network nodes, controls the router to add a header to each packet of data in the received communication traffic destined for the network node so that the processed received network traffic destined for the network node is forwarded by the access multiplexer to the network node through the network node's respective bonded link in a manner that is transparent to the access multiplexer.

12. The system of claim 11, wherein the bonded link comprises a plurality of constituent links, and the exchange gateway controller is operable to control the router so that whole packets of data in the received communication traffic destined for one of the network nodes are routed to one or more constituent links of the bonded link without segmentation.

13. The system of claim 12, wherein some of the constituent links may train up at different training rates across the bonded link, and the exchange gateway controller is operable to control the router so that packets of data in the received communication traffic destined for the network node are routed to constituent links of the bonded link based at least in part on at least one of: packet size; constituent link training rate; and packet data type.

14. The system of claim 13, wherein the exchange gateway controller is operable to control the router to route whole packets over one or more constituent links of the bonded link according to a priority driven bonding topology.

* * * * *